US012749489B2

(12) United States Patent
Nakano

(10) Patent No.: US 12,749,489 B2
(45) Date of Patent: Sep. 29, 2026

(54) CALL SYSTEM, CALL APPARATUS, CALL METHOD, AND NON-TRANSITORY COMPUTER-READABLE MEDIUM STORING PROGRAM

(71) Applicant: NEC Corporation, Tokyo (JP)

(72) Inventor: Tomohiro Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 133 days.

(21) Appl. No.: 18/723,922

(22) PCT Filed: Jan. 19, 2022

(86) PCT No.: PCT/JP2022/001715

§ 371 (c)(1),
(2) Date: Jun. 25, 2024

(87) PCT Pub. No.: WO2023/139673

PCT Pub. Date: Jul. 27, 2023

(65) Prior Publication Data

US 2025/0078837 A1 Mar. 6, 2025

(51) Int. Cl.
*G10L 15/00* (2013.01)
*G06V 40/16* (2022.01)
(Continued)

(52) U.S. Cl.
CPC ............ *G10L 15/25* (2013.01); *G06V 40/176* (2022.01); *H04W 4/026* (2013.01); *G10L 13/00* (2013.01)

(58) Field of Classification Search
CPC ....... G10L 15/16; G10L 19/005; G10L 19/00; G10L 25/27; G10L 25/30; G10L 15/02;
(Continued)

(56) References Cited

U.S. PATENT DOCUMENTS 10,089,305 B1 * 10/2018 Hodge .................... H04M 3/42
11,971,920 B1 * 4/2024 Kim ........................ G10L 15/26
(Continued)

FOREIGN PATENT DOCUMENTS

JP H10-240283 A 9/1998
JP 2002-268798 A 9/2002
JP 2003-18278 A 1/2003
JP 2005-33568 A 2/2005
JP 2005-057737 A 3/2005
JP 2007-096713 A 4/2007
(Continued)

OTHER PUBLICATIONS

International Search Report for PCT Application No. PCT/JP2022/001715, mailed on Apr. 5, 2022.

*Primary Examiner* — Vu B Hang
(74) *Attorney, Agent, or Firm* — Sughrue Mion, PLLC

(57) ABSTRACT

A call system includes a terminal, and an external server that generates a candidate for a predicted word in accordance with information transmitted from the terminal, in which the terminal includes a motion detection unit that detects a motion of the user, a communication function unit that performs communication of output non-vocalization data generated from the motion detected by the motion detection unit to the external server and receiving a candidate for a word predicted by the external server, and a candidate presentation unit that presents the candidate for the word received from the external server to the user, and the external server includes a prediction unit that predicts the candidate of the word in accordance with the received non-vocalization data, and a voice conversion unit that generates a voice to be output to a talk partner according to a word selected by the user among the word candidates.

11 Claims, 16 Drawing Sheets

(51) Int. Cl.

| | |
|---|---|
| ***G10L 15/25*** | (2013.01) |
| ***H04W 4/02*** | (2018.01) |
| *G10L 13/00* | (2006.01) |

(58) Field of Classification Search

CPC ....... G10L 15/063; G10L 15/12; G10L 15/07; G10L 15/20; G10L 15/22; G10L 15/26; G10L 15/30; G10L 15/08; G10L 15/1822; G10L 15/183; G10L 13/00; G10L 13/02; G10L 13/06; G10L 13/07; G10L 13/08; G10L 17/18; G10L 15/14; G10L 15/197; G10L 15/1815; G10L 15/25; H04W 4/026; G06V 40/176

See application file for complete search history.

(56) References Cited

U.S. PATENT DOCUMENTS

| | | | | |
|---|---|---|---|---|
| 12,026,530 | B2 * | 7/2024 | Zhang ................. | G06F 16/3329 |
| 2009/0299730 | A1 * | 12/2009 | Joh ....................... | G06F 40/232<br>707/E17.014 |
| 2016/0156771 | A1 * | 6/2016 | Lee ....................... | H04M 1/724<br>455/414.1 |

FOREIGN PATENT DOCUMENTS

| | | |
|---|---|---|
| JP | 2015-115926 A | 6/2015 |
| JP | 2019-124777 A | 7/2019 |

* cited by examiner

CALL SYSTEM, CALL APPARATUS, CALL METHOD, AND NON-TRANSITORY COMPUTER-READABLE MEDIUM STORING PROGRAM

This application is a National Stage Entry of PCT/JP2022/001715 filed on Jan. 19, 2022, the contents of all of which are incorporated herein by reference, in their entirety.

TECHNICAL FIELD

The present invention relates to a call system, a call apparatus, a call method, and a program by no speech and prediction conversion.

BACKGROUND ART

In recent years, a mobile terminal that can be carried by each individual and used as a contact means by telephone communication or the like has been used. In general, a mobile terminal has a function of transmitting character information input by manually operating the mobile terminal, a function of capturing an image of the surroundings by a built-in camera, and a function of receiving these pieces of information, in addition to a voice call function.

Patent Literature 1 discloses a communication terminal device that selects a character string indicating a content desired to be conveyed to the talk partner on a dial character string setting screen in a place or a state where it is difficult to utter a voice to answer an incoming call, generates phonological information and rhythm information from the selected character string, and then transmits voice data with a voice quality matching voice quality information corresponding to an attribute set on an attribute setting screen.

In addition, Patent Literature 2 discloses a voice input device in which a vibrator instead of vocal cords is brought into close contact with a neck, vibration generated by the vibrator is articulated by changing a shape of a tongue or a mouth in an oral cavity, and the vibration is collected by a microphone such as a contact microphone brought into close contact with the neck, whereby communication, voice input, and the like can be performed without leaking voice to the outside.

In addition, Patent Literature 3 discloses a word recognition apparatus that inputs voice rhythm of a word using a rhythm button, and detects the corresponding word by comparing the input voice rhythm with a voice pattern data table previously defined and stored in a memory.

In addition, Patent Literature 4 discloses a voice processing apparatus in which a voice recognition unit performs voice recognition and outputs voice synthesis original data obtained by removing ambient noise from a voice signal including a voice of a talker and the ambient noise, and a voice synthesis unit outputs an audible synthesized voice from the voice synthesis original data.

In addition, Patent Literature 5 discloses a communication device that analyzes a movement of a mouth to output a voice to a talk target, performs voice recognition processing on a voice signal obtained from the talk target to provide the processed voice signal, and analyzes the movement of the mouth from an imaging result obtained from the talk target to generate a voice and a text. In addition, Patent Literature 6 discloses a non-voice communication system that photographs a mouth of a user at predetermined time intervals, recognizes characters according to a shape of the mouth from a photographed image with reference to a basic mouth shape image database, sets a plurality of recognized characters as character strings, searches a plurality of vocabularies close to the character strings with reference to a vocabulary database, and outputs, as candidates, a plurality of character strings in a word order having a high use frequency on a selection frequency database.

Furthermore, Patent Literature 7 discloses an information processing apparatus that acquires a processing target image including a lip of a recognition target person, calculates similarity between the acquired processing target image and each of a plurality of reference images corresponding to a plurality of words, determines a pronunciation candidate word related to the processing target image based on the similarity, determines a predetermined similar sound priority word as a pronunciation word from among a plurality of pronunciation candidate words in a case where there is a plurality of pronunciation candidate words, and causes an output device to voice-output the determined similar sound priority word.

CITATION LIST

Patent Literature

- Patent Literature 1: Japanese Unexamined Patent Application Publication No. 2007-096713
- Patent Literature 2: Japanese Unexamined Patent Application Publication No. 2005-057737
- Patent Literature 3: Japanese Unexamined Patent Application Publication No. 2002-268798
- Patent Literature 4: Japanese Unexamined Patent Application Publication No. H10-240283
- Patent Literature 5: Japanese Unexamined Patent Application Publication No. 2003-18278
- Patent Literature 6: Japanese Unexamined Patent Application Publication No. 2005-33568
- Patent Literature 7: Japanese Unexamined Patent Application Publication No. 2019-124777

SUMMARY OF INVENTION

However, in a train, a library, or the like, when a call is made by utterance using a communication terminal having a call function, it may become a nuisance for surrounding people. In addition, as described in related Patent Literatures, in such an environment, it is also possible to use a function other than the call function such as e-mail or SMS, or to use an alternative call function of preparing some messages in advance, selecting a message from the messages, and outputting a voice. However, real-time performance tends to be poor when a question or the like is received from the talk partner. In addition, there is a related technique for executing a call with a small voice, but it does not take into consideration a state in which the user cannot speak due to, for example, abnormality of vocal cords of the user. In addition, when a wearable terminal or the like is used, there is also a demand for downsizing the terminal itself.

An object of the present disclosure is to provide a call system, a call apparatus, and a call method capable of making a call using a small terminal in an environment where a conversation accompanied by utterance is restricted.

A call system according to the present example embodiment includes a terminal held by a user and an external server that generates a candidate of a predicted word according to information transmitted from the terminal, in which the terminal includes a motion detection unit that detects a motion of the user, a communication function unit that performs communication of outputting non-vocalization data generated from the motion of the user detected by the motion detection unit to the external server and receiving a candidate for a word predicted by the external server, and a candidate presentation unit that presents the candidate of the word received from the external server to the user, and the external server includes a prediction unit that predicts the candidate of the word in accordance with the non-vocalization data received from the terminal, and a voice conversion unit that generates a voice to be output to a talk partner according to a word selected by the user among the candidates of the word.

Furthermore, a call apparatus according to the present example embodiment includes a motion detection unit that detects a motion of a user, a user profile that stores unique information different for each user, a prediction unit that generates non-vocalization data from the motion of the user detected by the motion detection unit and generates a plurality of word candidates predicted according to the non-vocalization data, and a voice conversion unit that generates a voice to be output to a talk partner according to a word selected by the user from among the plurality of word candidates generated by the prediction unit, in which the prediction unit changes a candidate of a word to be predicted according to the unique information stored in the user profile.

In addition, a call method according to the present example embodiment includes storing in advance unique information different for each user, detecting a motion of the user, generating non-vocalization data from the detected motion of the user, generating a plurality of word candidates predicted according to the non-vocalization data and the unique information different for each user stored in advance, and generating a voice to be output to a talk partner according to a word selected by the user from among the plurality of word candidates.

Furthermore, a program according to the present example embodiment includes a step of storing in advance unique information different for each user, a step of detecting a motion of the user, a step of generating non-vocalization data from the detected motion of the user, a step of generating a plurality of word candidates predicted according to the non-vocalization data and the unique information different for each user stored in advance, and a step of generating a voice to be output to a talk partner according to a word selected by the user from among the plurality of word candidates.

As a result, it is possible to make a call using a small terminal in an environment where a conversation accompanied by utterance is restricted.

EXAMPLE EMBODIMENT

First Example Embodiment

Figure 1:
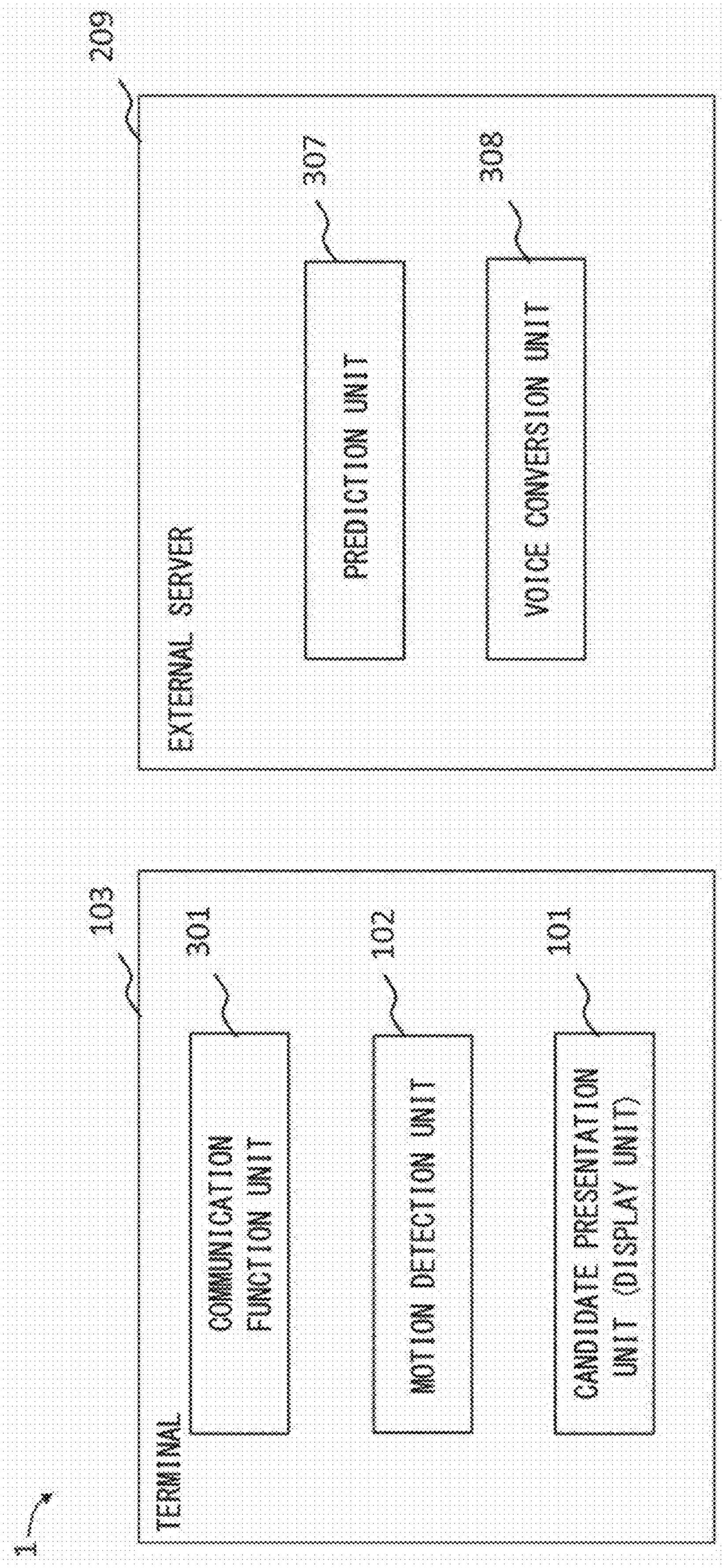
FIG. 1 is a diagram illustrating an example of a configuration of a call system according to a first example embodiment.

FIG. 1 illustrates an example of a configuration of a call system 1. The call system 1 includes a terminal 103 which is a call apparatus possessed by a user, and an external server 209 which generates a candidate of a predicted word according to information transmitted from the terminal 103. The terminal 103 includes a motion detection unit 102 that detects the motion of the user, a communication function unit 301 that performs communication of generating non-vocalization data from the motion of the user detected by the motion detection unit 102, outputting the data to the external server 209, and receiving a word candidate predicted in the external server 209, and a candidate presentation unit 101 that presents the word candidate received from the external server 209. The external server 209 includes a prediction unit 307 that predicts a word candidate according to the non-vocalization data received from the terminal 103, and a voice conversion unit 308 that generates a voice to be output to the talk partner according to a word selected by the user in the terminal 103 among the word candidates.

Note that, typically, the external server 209 includes a communication function unit 305 that performs communication with the terminal 103, similarly to a second example embodiment described later. In the following description, unless otherwise specified, the candidate presentation unit 101 will be described as a display unit 101 that displays the word candidates received from the external server 209 on the screen.

Figure 2:
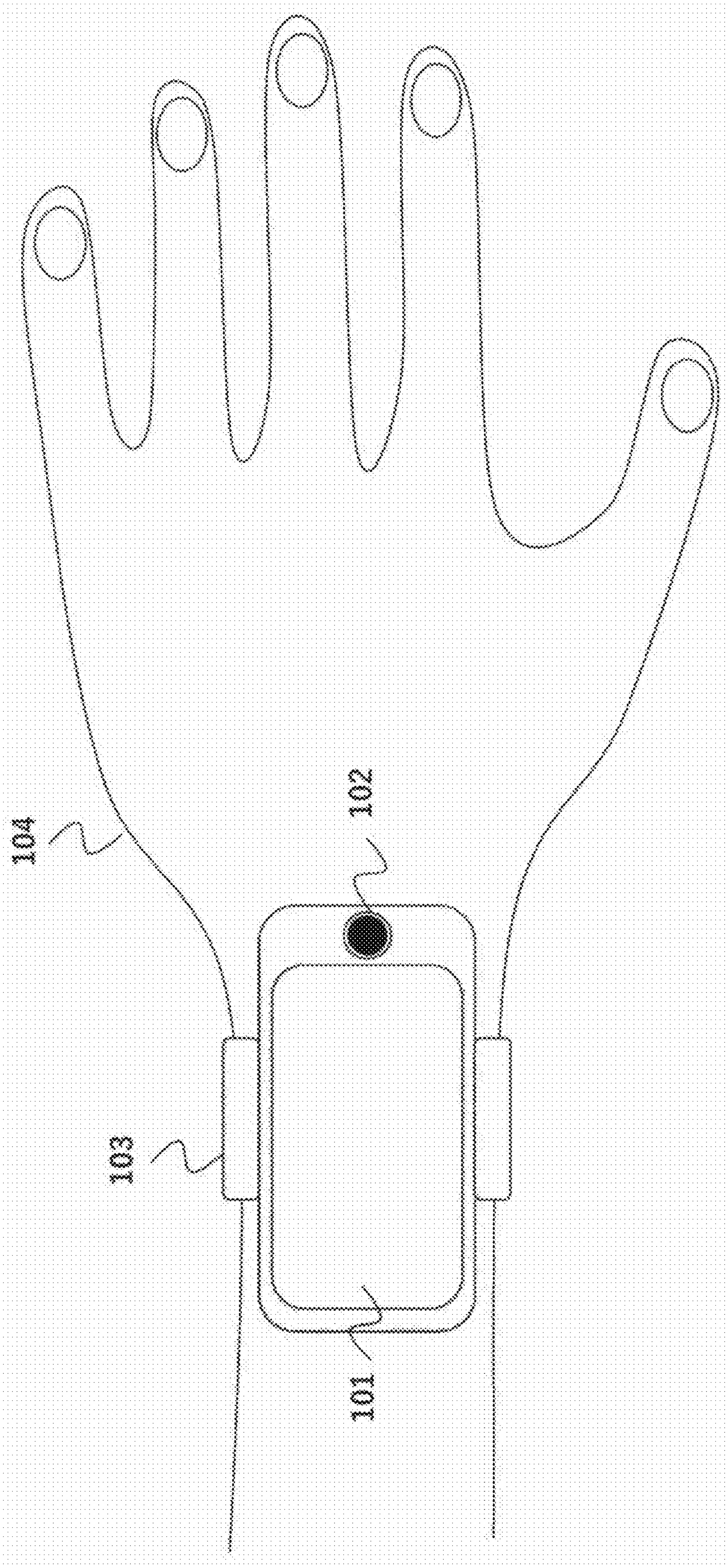
FIG. 2 is a diagram illustrating an example of a state in which a wearable terminal worn on an arm of a user is used as a terminal according to the first example embodiment.

Here, as an example, FIG. 2 illustrates a state in which a wearable terminal worn on a wrist of the user is used as the terminal 103 possessed by the user. That is, FIG. 2 illustrates a state in which the terminal 103 including the display unit 101 that displays character information and the motion detection unit 102 capable of detecting the motion of the user is worn on an arm 104 of the user.

The terminal 103 is a communication terminal having a call function. Furthermore, as the motion detection unit 102 capable of detecting the motion of the user, a camera that captures the motion of the mouth of the user can be used. Note that the user moves the terminal 103 so that the motion detection unit 102 can read the movement of the user's own mouth.

As a result, the terminal 103 can read the movement of the mouth of the user in the motion detection unit 102, predict a word to be uttered in the prediction unit 307 of the external server 209 from the read motion of the mouth to generate a word candidate, and the voice conversion unit 308 of the external server 209 can generate a voice for a word selected by the user in the terminal 103 from among the word candidates.

Figure 3:
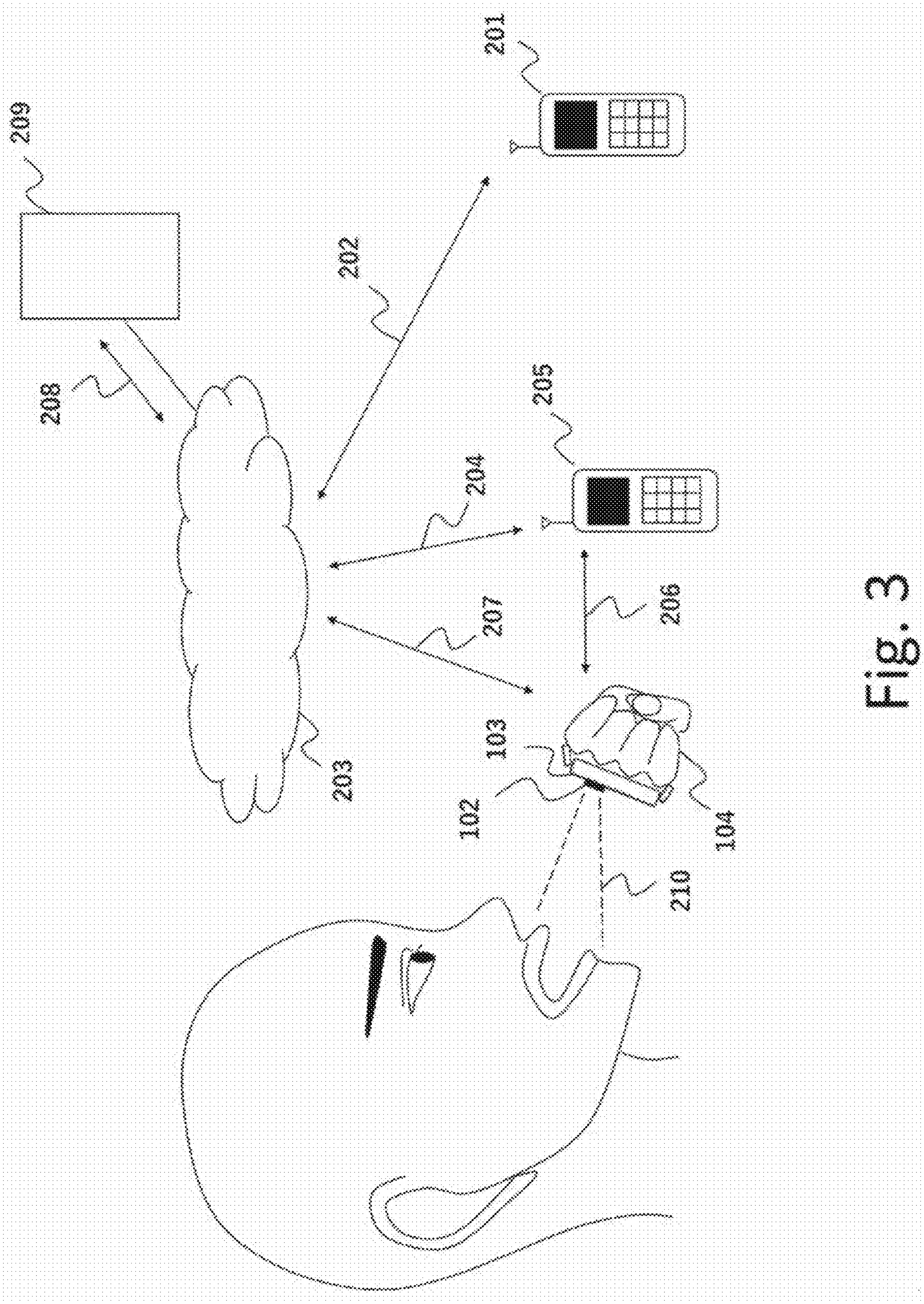
FIG. 3 is a diagram illustrating an example of a reception with a talk partner according to the first example embodiment.

FIG. 3 is a diagram illustrating an example of reception with the communication terminal 201 of the talk partner in the call system 1. Here, the user has a terminal 103 which is a wearable terminal and a communication terminal 205 which is a normal communication terminal, and can arbitrarily switch a device for a call.

For example, it is assumed that there is a transmitted radio wave 202 from the communication terminal 201 on the talk partner side having the call function, and an incoming radio wave 204 is received by the communication terminal 205 on the user side having the communication function via a communication line network 203. At this time, the terminal 103 of the user is notified 206 that there is an incoming call from the talk partner, and it is confirmed whether the user responds to the call with no utterance.

In a case where the user selects to respond with no utterance, the call apparatus is switched from the communication terminal 205 to the terminal 103, the radio wave 207 is transmitted from the terminal 103 to the communication line network 203, the radio wave 208 is transmitted to the external server 209 via the communication line network 203, and the start of the silent call is notified. After the notification that the terminal 103 is in the available state is received from the external server 209, the user utters a word without utterance, and the motion detection unit 102 of the terminal 103 reads the motion of the mouth of the user to generate and transmit the non-vocalization data 210 to the external server 209.

After the external server 209 selects an assumed word, the word is transmitted to the terminal 103, and the user selects the term, so that voice data of the corresponding word is transmitted as a voice from the external server 209 to the communication terminal 201 on the talk partner side having a communication function via the communication line network 203, thereby enabling the same as a normal call.

This makes it possible to talk as if the user were actually uttering, regardless of the place or even when the user is in a state of not speaking due to vocal cord abnormality or the like.

Second Example Embodiment

Figure 4:
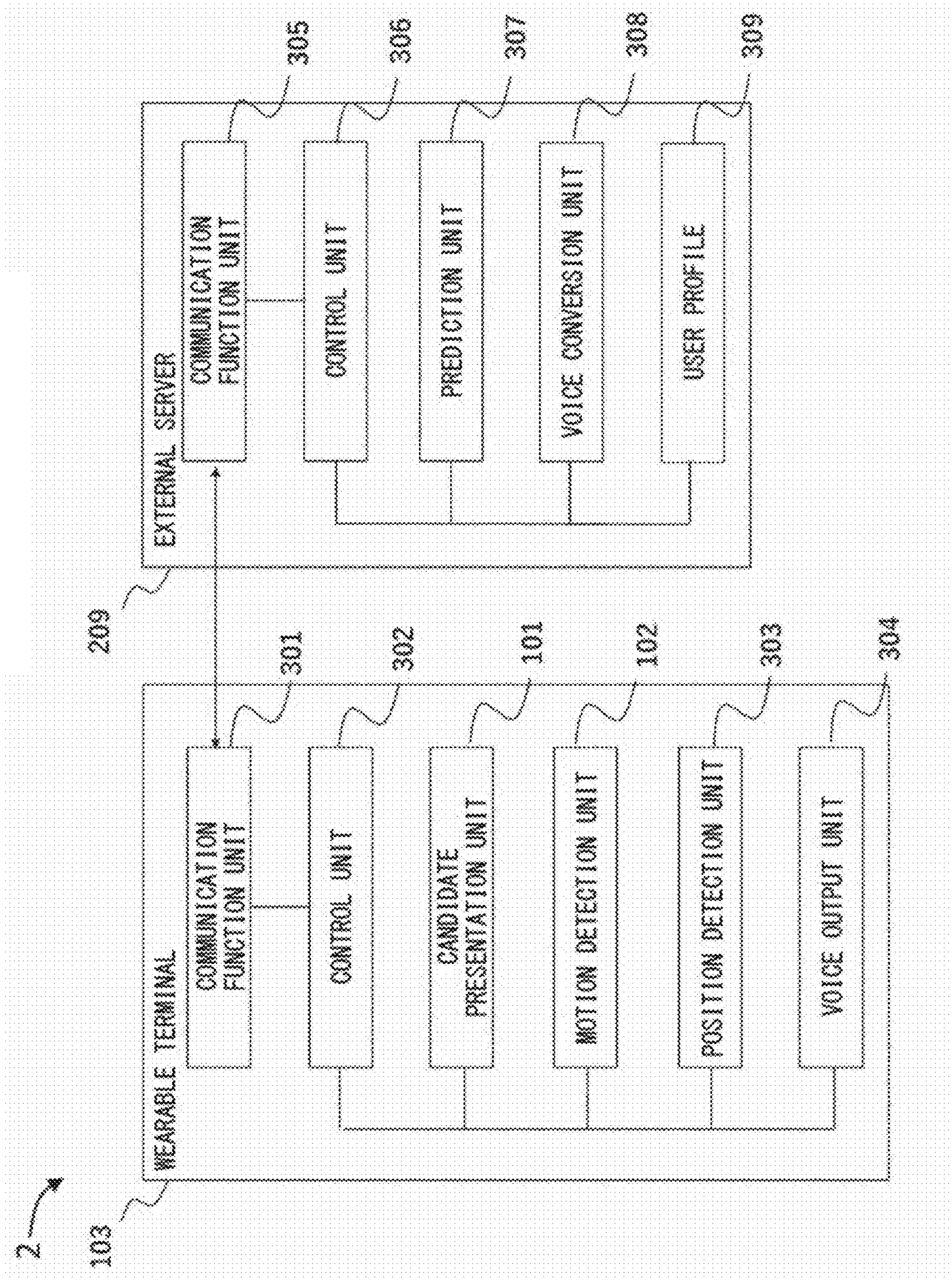
FIG. 4 is a diagram illustrating an example of a configuration of a call system according to a second example embodiment.

Next, a call system 2 having another configuration will be described with reference to FIG. 4. Note that constituent articles having functions similar to those of the constituent articles of the call system 1 described in the first example embodiment are denoted by the same reference numerals, and description thereof may be omitted.

The call system 2 includes a terminal 103 possessed by a user and an external server 209 that generates a candidate for a predicted word according to information transmitted from the terminal 103. The terminal 103 includes a communication function unit 301 for communicating with the external server 209, a small and low-performance control unit 302 such as a CPU or a microcomputer specialized in performing necessary minimum control with each function unit, a display unit 101 that displays characters and images, a motion detection unit 102 that detects the movement of the mouth of the user, a position detection unit 303 that specifies position information of the user such as GPS, and a voice output unit 304 for the user to listen to the talk partner such as a speaker or an earphone.

The external server 209 includes a communication function unit 305 for communicating with the wearable terminal 103, a large and high-performance control unit 306 such as a CPU for a server or a CPU for a workstation capable of performing complicated control of each function unit, a prediction unit 307 that predicts detected content as a word, a voice conversion unit 308 that converts a correct word from the prediction into a voice and transmits the voice to the communication terminal 201 on the talk partner side, and a user profile 309 that stores the use record of the user so far.

Typically, in the terminal 103, the control unit 302 can control operations of the communication function unit 301, the display unit 101, the motion detection unit 102, the position detection unit 303, and the voice output unit 304.

In addition, the communication function unit 301 can transmit and receive data to and from the communication function unit 305 of the external server 209.

As will be described in detail later, transmission and reception between the communication function unit 301 of the terminal 103 and the communication function unit 305 of the external server 209 include, but are not limited to, transmission of non-vocalization data, which is information regarding the movement of the mouth of the user, from the terminal 103 to the external server 209, transmission of information regarding a plurality of word candidates predicted by the external server 209, from the external server 209 to the terminal 103, transmission of information regarding a word selected from a plurality of word candidates of the external server 209 from the terminal 103, and the like.

Figure 5:
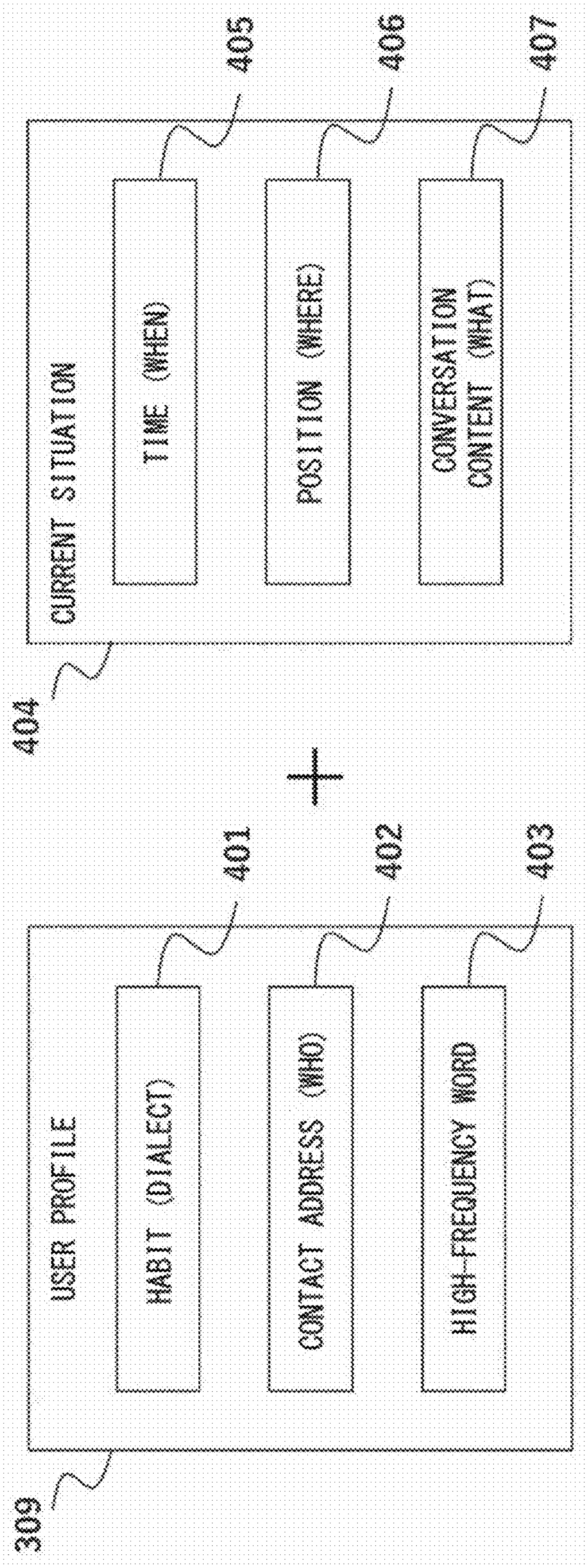
FIG. 5 is a diagram illustrating an example of a user profile and a current situation related to word prediction according to the second example embodiment.

Here, the user profile 309 used to increase the accuracy of an assumed word from the movement of the mouth of the user will be described. FIG. 5 is a diagram illustrating an example of the user profile 309. As an example, the user profile 309 mainly includes three pieces of information.

The user profile 309 includes, as first information, information regarding rounding of a dialect depending on the user's hometown in a habit 401 of the user, and words that are always spoken. In addition, the user profile 309 includes, as the second information, information regarding the use of words by family, friends, workplace, client, and the like in a contact address 402 of a communication partner. Furthermore, the user profile 309 includes, as third information, information regarding words that are frequently used by the user on a daily basis in a high-frequency word 403.

Furthermore, FIG. 5 illustrates elements for improving the accuracy of an assumed word by predicting a current situation 404 around the user while using the information included in the user profile 309.

That is, as illustrated in FIG. 5, the accuracy of the prediction word can be further enhanced by combining the information included in the user profile 309 with three pieces of information including a time 405 at which the user is talking, use position information 406 specified by the position detection unit 303 provided in the terminal 103, and a conversation content 407 such as greetings from the talk partner as the current situation 404 illustrated in FIG. 5.

For example, when the place between the user and the talk partner is far away, and the talk partner contacts "O HA YO U (good morning)" in the morning, and the movement of the mouth of the user is a four-letter word, it can be determined that the possibility of "O HA YO U (good morning)" is high. In particular, in this case, the prediction unit 307 can predict the word candidate by using the information regarding the contact address 402 of the communication partner, the high-frequency word 403, and the time at which the user is talking, which are included in the user profile 309.

Next, an operation in the call system 2 will be described. Here, first, an operation in which the motion detection unit 102 detects the movement of the mouth of the user will be described. In other words, how to replace the motion of the mouth of the user with words will be described.

Figure 6:
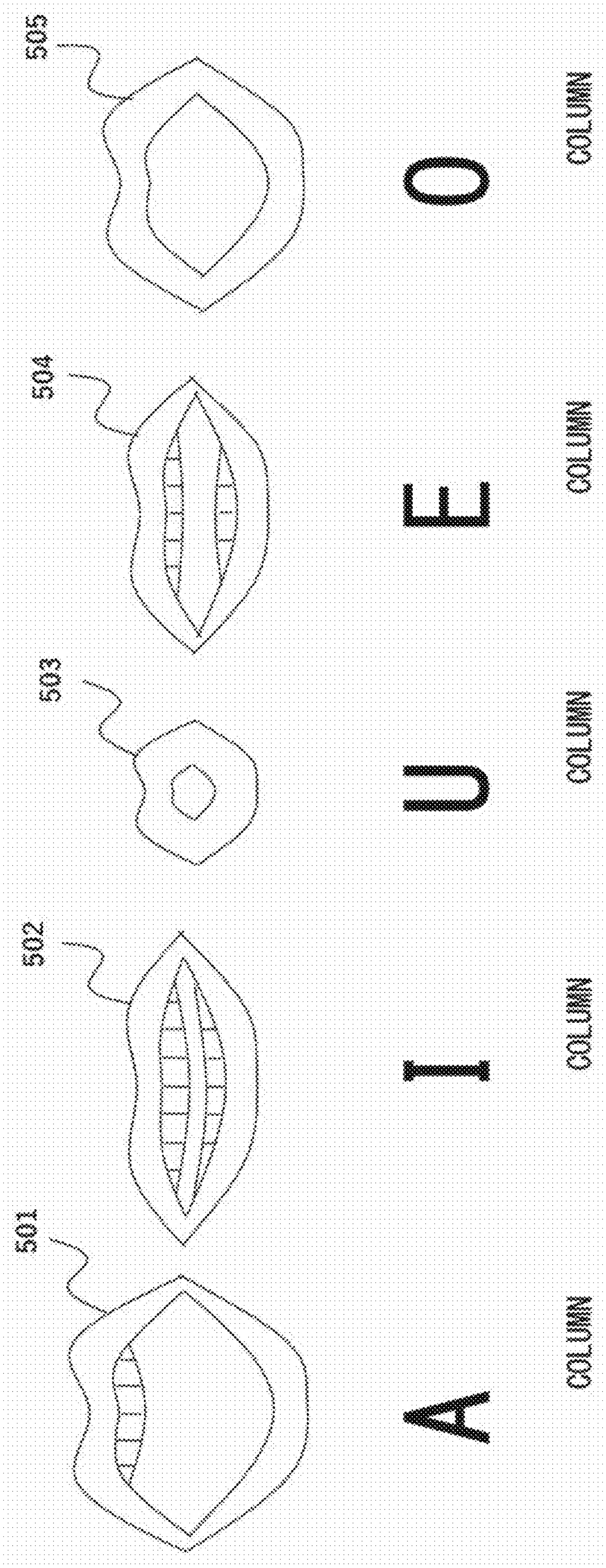
FIG. 6 is a diagram illustrating an example of motion of a mouth of a user according to the second example embodiment.

Here, FIG. 6 illustrates an example of the motion of the mouth of the user. As shown in FIG. 6, when a person opens to utter a word in Japanese, there are five patterns corresponding to "A", "I", "U", "E", and "O".

Here, not only "A" but also a Japanese column 501 of "KA, SA, TA, NA, Ha, MA, Ya, RA, WA" have the same opening for "A". The same applies to a Japanese "I" column 502, a Japanese "U" column 503, a Japanese "E" column 504, and a Japanese "O" column 505.

Figure 7:
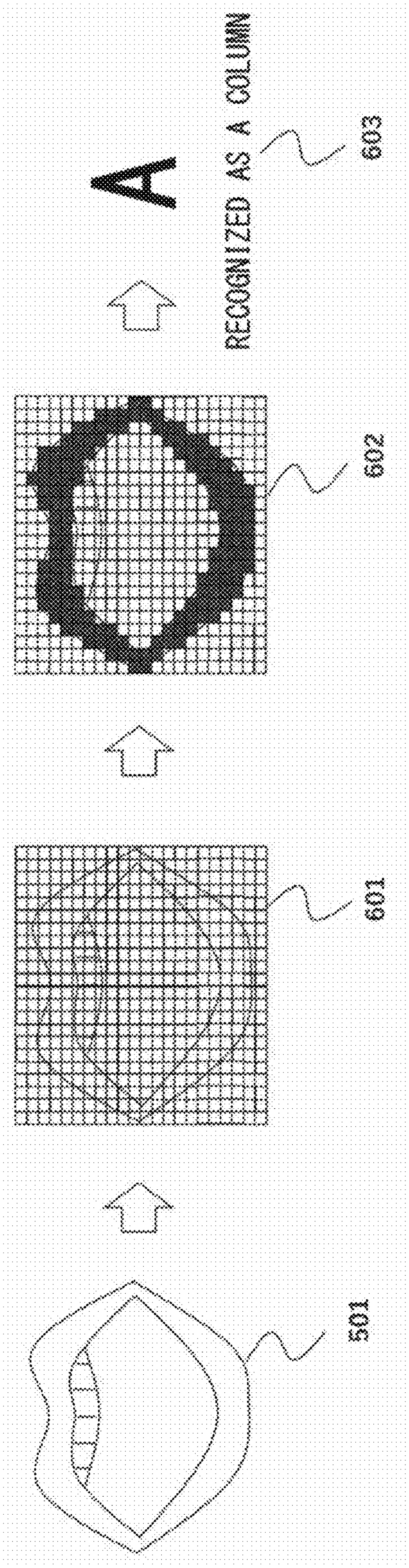
FIG. 7 is a diagram illustrating an example of reading an Japanese "A" column of a user by a motion detection unit according to the second example embodiment.

As an example of how to read the movement of the mouth, as illustrated in FIG. 7, the motion detection unit 102 can read the state of the movement of the mouth of the Japanese "A" column 501 opened so that the user utters "A".

Here, specifically, when the call system 2 is used, first, preparation is performed in advance. That is, the motion detection unit 102 acquires and registers the motions of the movements of the users of the Japanese "A" column 501, the Japanese "I" column 502, the Japanese "U" column 503, the Japanese "E" column 504, and the Japanese "O" column 505. Specifically, in the motion detection unit 102, the read information is subdivided 601 into a lattice shape, only the portion corresponding to the lips is extracted 602 by subdividing the read information, and the extracted information is digitized to create authentication data 603. That is, the authentication data 603 is created for each of the Japanese "A" column 501, the Japanese "I" column 502, the Japanese "U" column 503, the Japanese "E" column 504, and the Japanese "O" column 505.

Thereafter, when a silent call is performed using the call system 2, the motion detection unit 102 reads the movement of the mouth of the user, and compares the read movement of the mouth with the authentication data 603 in all five patterns. That is, it is determined which one of the five patterns from the authentication data 603 is applied to each opening, and the determination result is replaced with words.

Figure 8:
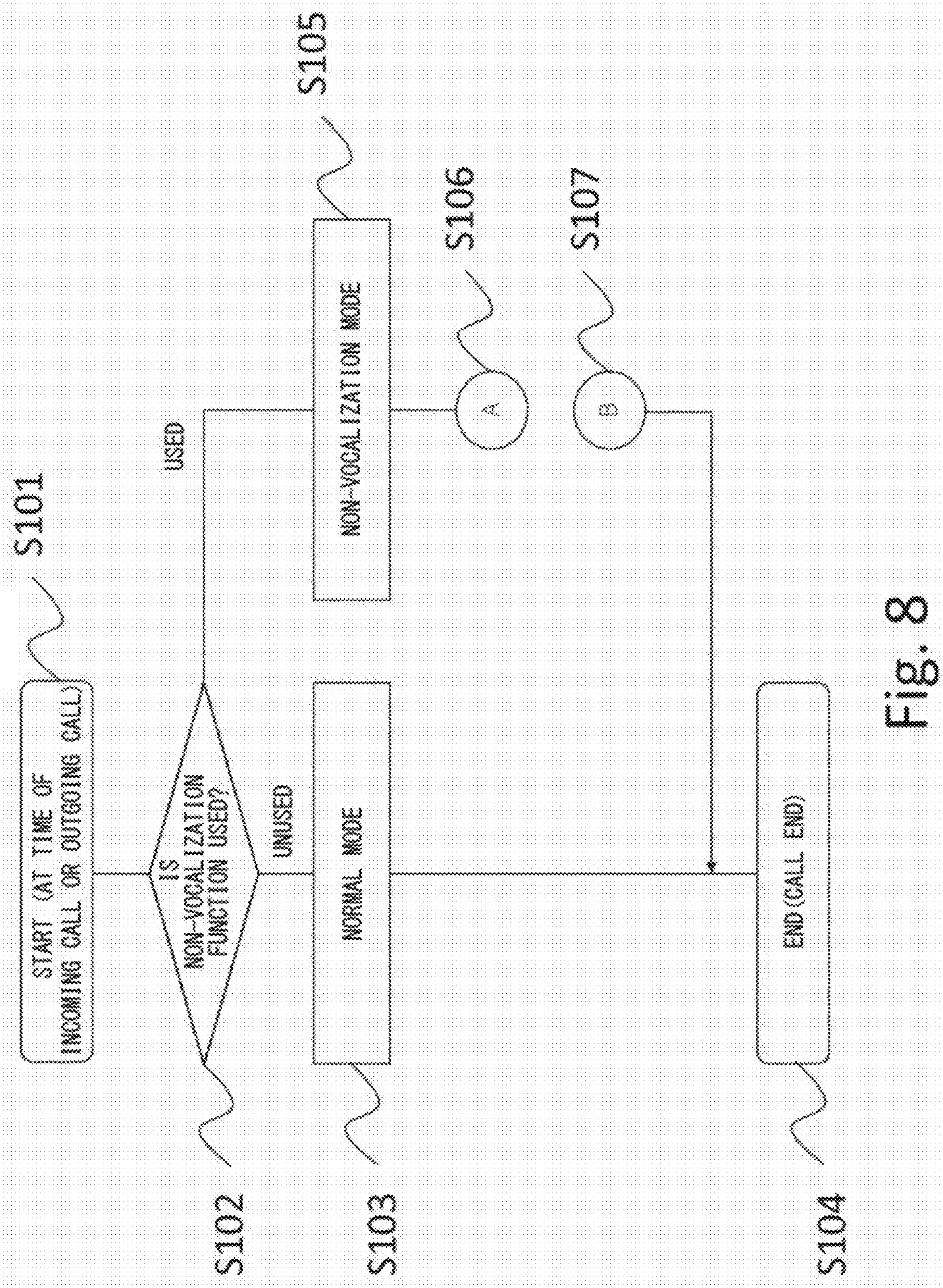
FIG. 8 is a diagram illustrating an operation flow of a terminal and an external server according to the second example embodiment.
Figure 9:
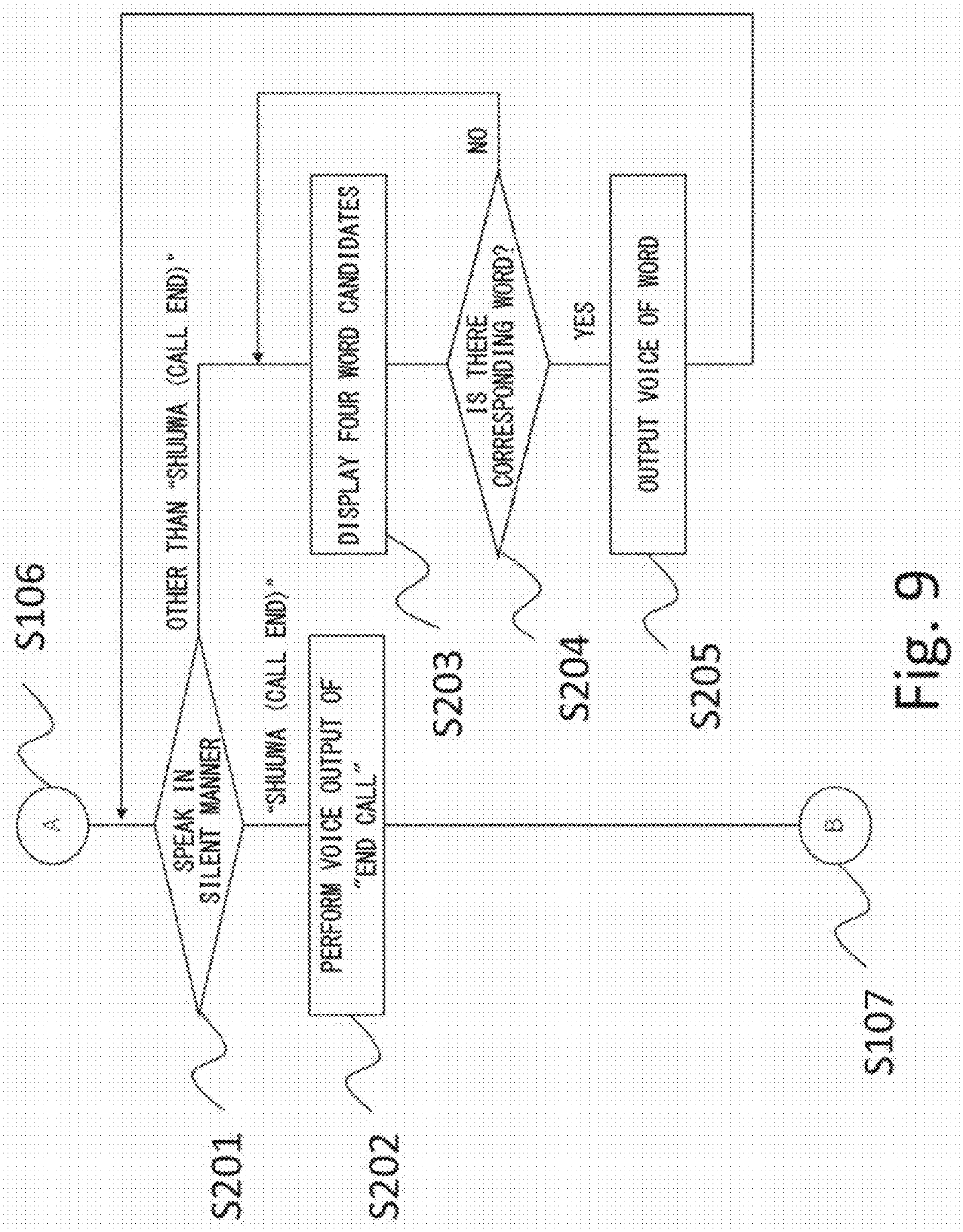
FIG. 9 is a diagram illustrating an operation flow of a terminal and an external server according to the second example embodiment.

Next, a series of operation flows of the terminal 103 and the external server 209 from the start of a call to the end of the call will be described with reference to FIGS. 8 and 9. Note that FIG. 9 illustrates details of the operation between A and B in FIG. 8.

First, the terminal 103 performs incoming call or outgoing call (Step S101). At this time, the user operates the terminal 103 to select whether to use a non-vocalization function (Step S102).

In a case where the non-vocalization function is not used, that is, in a case where the call by the vocalization function is selected (not used in Step S102), the call is performed in the normal mode (Step S103), and the call by the vocalization is performed by the communication terminal 205 having the communication function on the user side until the end of the call (Step S104).

Meanwhile, in a case where the use of the non-vocalization function is selected (used in Step S102), the terminal 103 communicates with the external server 209, and a non-vocalization mode is set as soon as the preparation of the external server 209 is completed (Step S105).

Note that, in a case where communication between the terminal 103 and the external server 209 is disabled, a silent call is also disabled, and thus, the communication terminal 201 having the communication function on the talk partner side is notified that the call cannot be performed, and the call is terminated.

After the start of the non-vocalization mode, the flow proceeds to a flow for performing control in a silent manner (Step S106). After shifting to the non-vocalization mode, the user performs an operation of moving the mouth so as to speak in a silent manner (Step S201). The motion detection unit 102 of the terminal 103 detects the motion of the mouth of the user.

Note that, in a case where the above-described word is "SHUUWA (call end)", the terminal 103 determines that the use has ended in a silent manner, and performs voice output of "end the call" (Step S202). Then, the non-vocalization mode is ended (Step S107), and the speech is ended (Step S104).

Therefore, when the word mentioned by the user is other than "SHUUWA (call end)", the terminal 103 determines that the user has uttered a word that the user wants to talk with, and displays a word candidate on the display unit 101 based on the read information (Step S203).

More specifically, in the terminal 103, the motion detection unit 102 reads the movement of the mouth of the user and replaces the motion with words using the authentication data 603. Then, the terminal 103 outputs the replaced word to the external server 209 as non-vocalization data. Note that, at this time, information related to the terminal 103 such as position information of the terminal 103 can also be output from the terminal to the external server 209.

Then, the prediction unit 307 of the external server 209 predicts a word candidate corresponding to the movement of the mouth of the user read by the motion detection unit 102, using the non-vocalization data, the information included in the user profile 309, the current time, and the position information of the terminal 103. Here, the external server 209 predicts four word candidates and transmits the four word candidates to the terminal 103. As a result, in the terminal 103, four word candidates can be displayed on the display unit 101 (Step S203).

The user checks whether there is a corresponding word from among the four word candidates displayed on the display unit 101 (Step S204). When there is no corresponding word, the user indicates the fact to the terminal 103, and the process returns to Step S203. Then, new four word candidates are displayed on the display unit 101 of the terminal 103, and the user confirms again whether there is a corresponding word.

When there is the corresponding word, the user indicates the fact to the terminal 103, and transmits the selected word from the terminal 103 to the external server 209. The external server 209 generates a voice and utters the voice (Step S205). Thereafter, Steps S201 to S205 are repeated until “SHUUWA (call end)” is uttered in a silent manner.

Note that whether or not the word mentioned by the user is “SHUUWA (call end)” may be determined by the terminal 103 when the motion detection unit 102 reads the movement of the mouth of the user in the terminal 103, or information regarding the movement of the mouth of the user read by the motion detection unit 102 may be transmitted from the terminal 103 to the external server 209 as non-vocalization data and determined by the prediction unit 307 of the external server 209.

Here, with reference to FIG. 10, an example of a method of confirming whether the corresponding word in Step S204 of FIG. 9 is included in the word candidates and selecting the word when the corresponding word is present will be described.

Note that, here, a procedure will be described in which a sensor (not illustrated) for acquiring a tilt of the terminal 103 is provided in advance in the terminal 103, and an arbitrary word is selected from word candidates displayed on the display unit 101 according to the tilt of the sensor. As illustrated in FIG. 10, this sensor can recognize four directions of an upper left corner 705 direction, a lower left corner 706 direction, an upper right corner 707 direction, and a lower right corner 708 direction as a tilt direction of the terminal 103.

First, as described above, since there are only five patterns (A, I, U, E, O) of the Japanese “A” row in the opening of a person, the word “SHIOUCHISHIMASHITA (I understand)” becomes also “IQUIAIA”. In the terminal 103, the information regarding the motion of the mouth such as the opening read by the motion detection unit 102 is output to the external server 209 as the non-vocalization data, and the prediction unit 307 of the external server 209 predicts the word desired by the user. Then, the predicted four word candidates are returned from the external server 209 to the terminal 103, and the four word candidates are displayed on the display unit 101.

Figure 10:
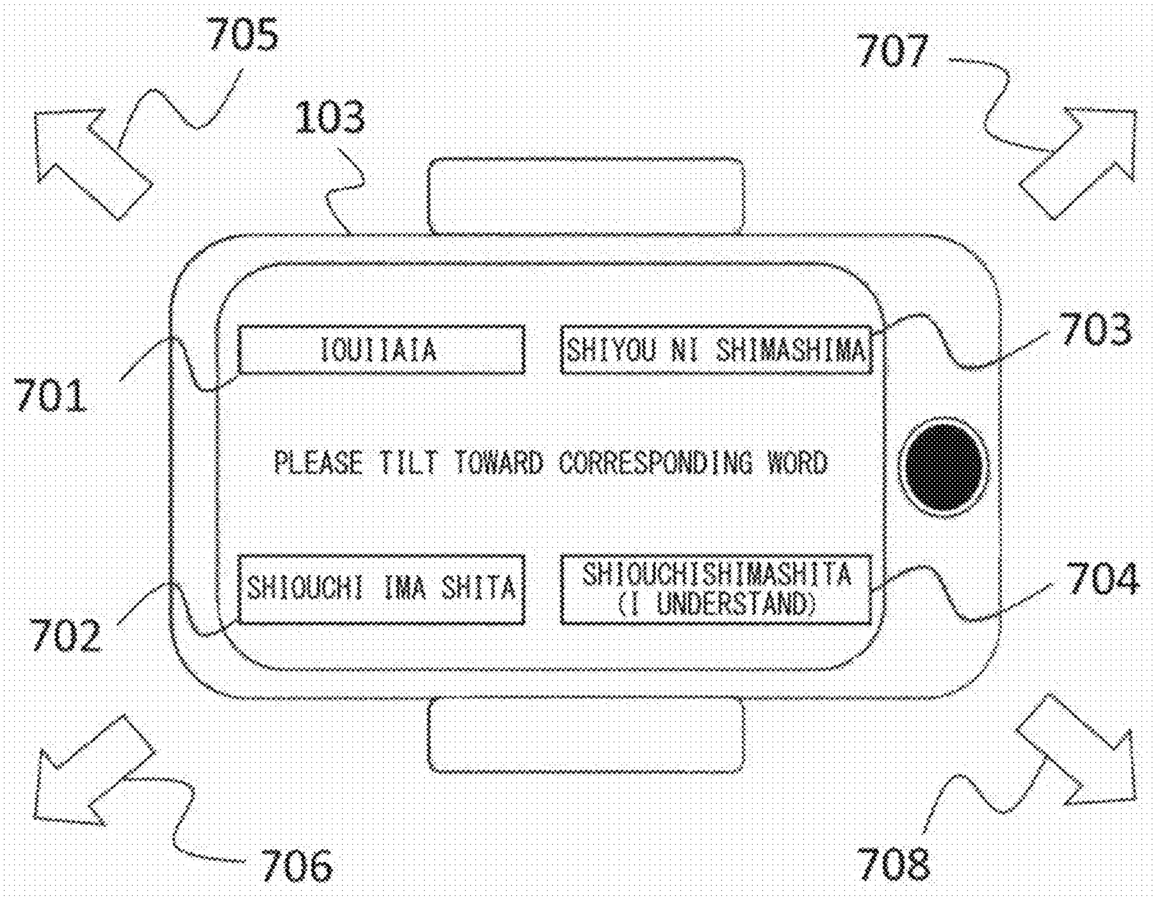
FIG. 10 is a diagram illustrating a state in which an arbitrary word is selected from word candidates displayed on a display unit according to tilt of the sensor according to the second example embodiment.

At this time, as illustrated in FIG. 10, the display unit 101 of the terminal 103 displays four word candidates at four corners of an upper left corner 701, a lower left corner 702, an upper right corner 703, and a lower right corner 704. Then, on the display unit 101 of the terminal 103, “please tilt toward the corresponding word” is displayed on the display unit 101 of the terminal 103, and the user is caused to execute an operation of tilting the terminal 103 in one of the four directions and selecting the corresponding word.

At this time, when there is no corresponding word among the four word candidates displayed on the display unit 101, the user performs an operation indicating that there is no corresponding word set in advance. For example, when the motion detection unit 102 detects a motion in which the user shakes his/her head right and left, it is possible to output from the terminal 103 to the external server 209 that there is no corresponding word among the four word candidates. Furthermore, in this case, the prediction unit 307 of the external server 209 can predict a new word candidate and output the new word candidate from the external server 209 to the terminal 103.

In the case of this example, since “SHIOUCHISHIMASHITA (I understand)” is the word expected by the user, the user inclines the terminal 103 in the direction of the lower right corner 708 and selects the word of the lower right corner 704.

Note that the method for causing the terminal 103 to recognize that there is no word intended by the user among the word candidates is not limited to the method in which the motion detection unit 102 detects the motion of the user shaking the head left and right, and can be changed to any method. For example, it is possible to operate the terminal 103 so that a reacquiring button provided in advance in the terminal 103 is pressed, the terminal 103 is not tilted for a certain period of time, and none of the upper left corner 701, the lower left corner 702, the upper right corner 703, and the lower right corner 704 in the display unit 101 is selected. Alternatively, the method can be changed to a method of assigning that one of the upper left corner 701, the lower left corner 702, the upper right corner 703, and the lower right corner 704 does not correspond to the three candidates of the word displayed on the display unit 101.

As a result, the movement of the mouth of the user can be read by the terminal 103 having a motion detection function such as a camera. Here, by registering the movement of the mouth of the user before use, it is possible to use the movement of the mouth of the user when it is determined which word the user wants to speak, and whether the determined word is correct, it is possible to display several predicted words on the terminal 103 to select a word intended by the user. Then, in the external server 209, by uttering a word selected by the user instead of the user, the word can be used for a call with the talk partner.

Here, in the call system 2, the high-speed processing and large-capacity external server 209 can preferentially select a word suitable for the user from the use record and the use situation so far. Therefore, it is possible to use high-speed and low-delay communication of 5G or higher for communication between the terminal 103 and the external server 209, and in particular, even in a case where a plurality of candidate words is assumed from the movement of the mouth of the user, the user can respond without uttering without impairing the real-time property.

Furthermore, since an operation requiring high information processing capability such as word prediction is executed in the external server 209, high information processing capability is unnecessary in the terminal 103. Therefore, the terminal 103 can be downsized.

In this way, it is possible to talk in a place where a conversation accompanied by utterance is avoided, such as in a train or in a library. Therefore, it is not necessary for the user to tell only that he/she is at a place where he/she refrains from talking and call again later, or to take a response such as sending a message prepared in advance, and in particular, in a case where there is an emergency, it is possible to immediately tell a word that the user wants to talk to.

In addition, a user having vocal cord abnormality can use a contact method by voice call instead of an alternative means such as e-mail or SMS.

Third Example Embodiment

Figure 11:
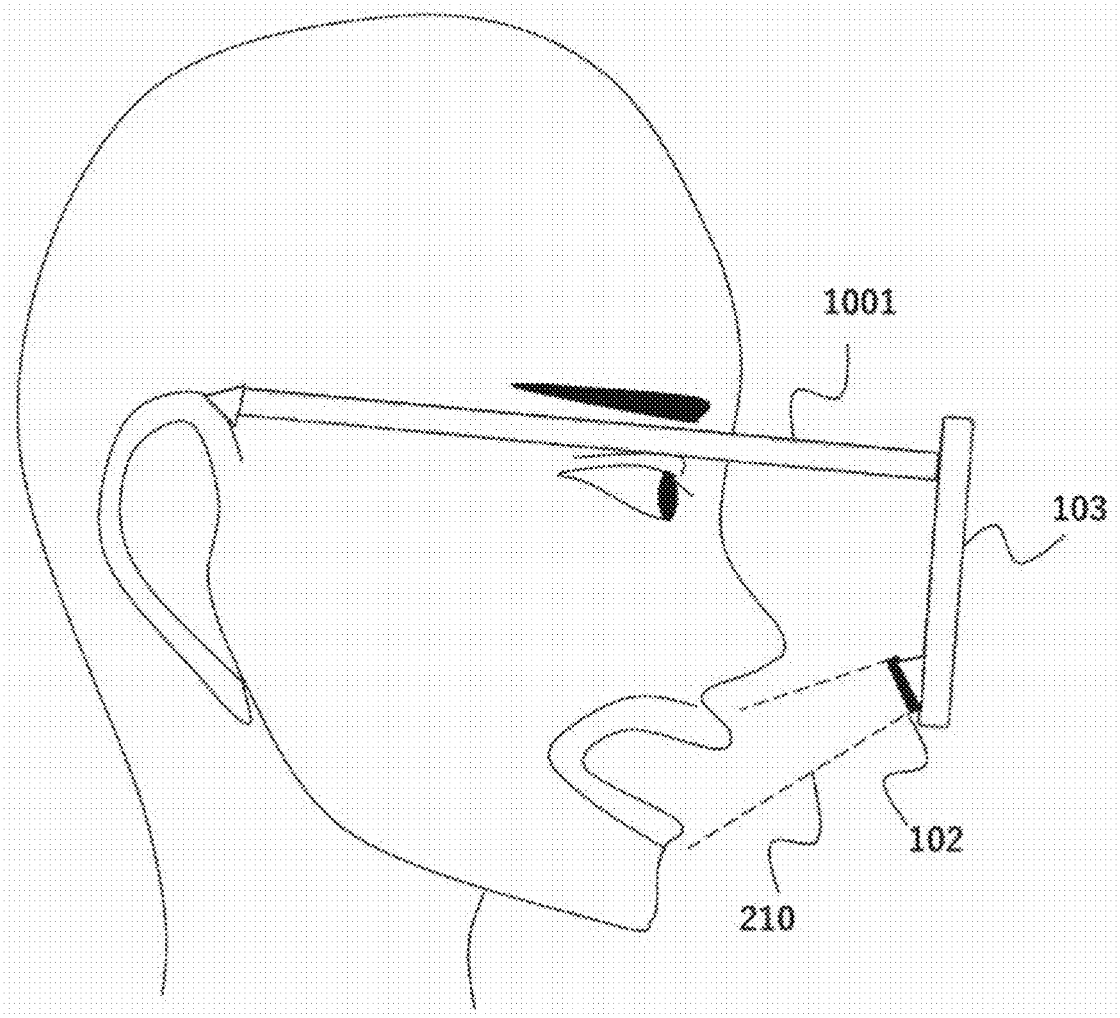
FIG. 11 is a diagram illustrating a state in which a terminal according to a third example embodiment is worn on a head of a user.

In the first example embodiment and the second example embodiment, the terminal 103 has been described as a wearable terminal worn on the user’s arm, but the present invention is not limited thereto. That is, as illustrated in FIG. 11, the terminal 103 can be used by being worn on the user’s head like eyeglasses 1001.

Fourth Example Embodiment

In any one of the first to third example embodiments, or an example embodiment combining them, the terminal 103 can be changed to one that uses a simple communication function via another communication terminal.

Figure 12:
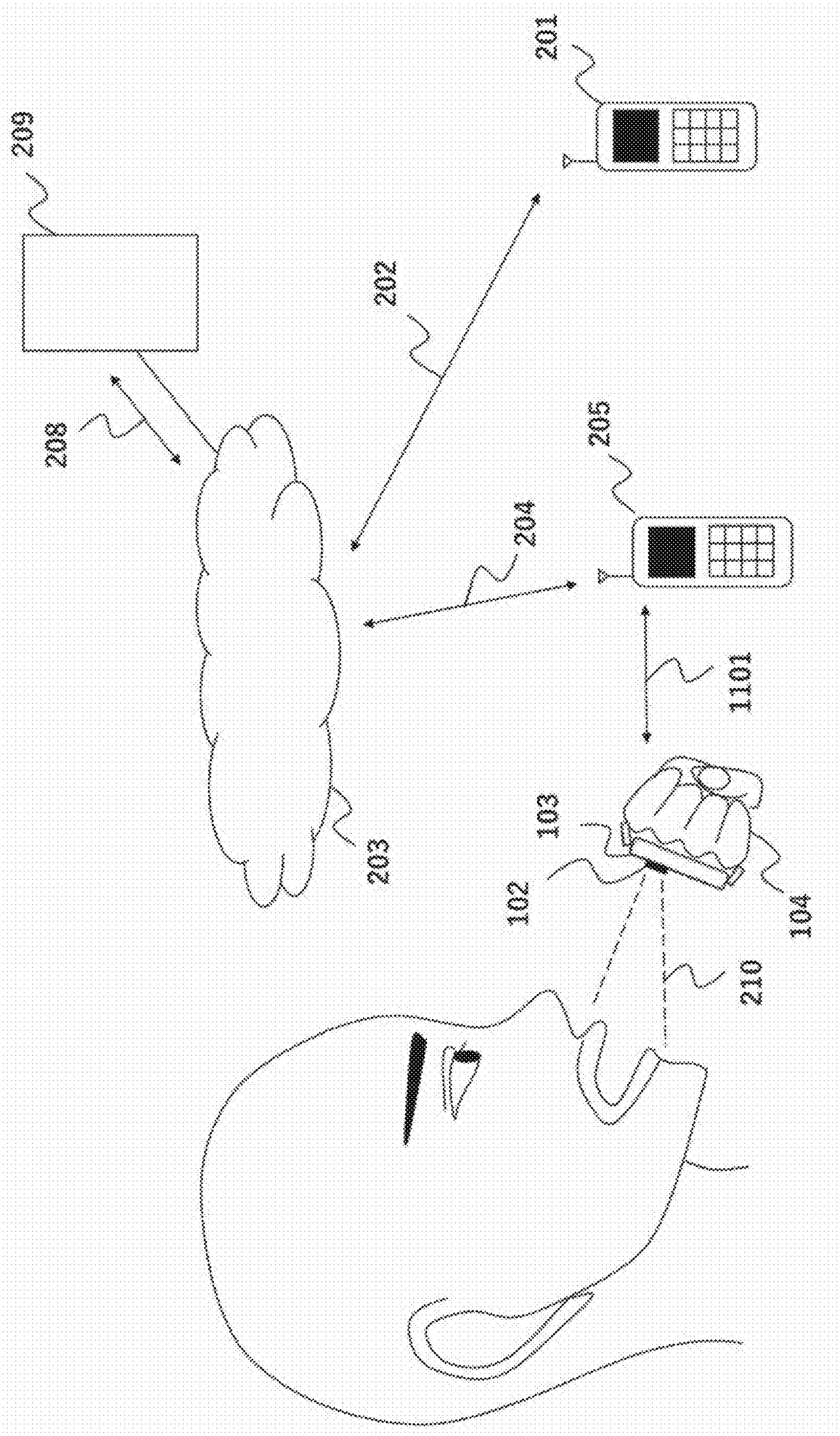
FIG. 12 is a diagram illustrating an example of a state in which a terminal according to a fourth example embodiment performs short-distance communication and uses a call system.

For example, as illustrated in FIG. 12, the communication function unit 301 that communicates with the external server 209 may perform communication 1101 via the communication terminal 205 having a communication function on the user side, so that the terminal 103 side may be a simple communication function unit having only a short-distance communication function such as Bluetooth (registered trademark). As a result, further miniaturization of the terminal 103 can be realized.

Fifth Example Embodiment

In any one of the first to fourth example embodiments, or an example embodiment in which these example embodiments are combined, a voice of a user can be used for the voice conversion unit 308.

For example, 50 sounds can be registered in advance in the voice conversion unit 308 as the fourth information of the user profile one by one. Then, when the voice conversion unit 308 generates a voice to the talk partner, it is possible to tell the talk partner that the voice call is being performed more naturally by combining the registered 50 sounds and outputting the voice.

Sixth Example Embodiment

In the first to fifth example embodiments, it has been described that the call system operates by the joint operation between the terminal 103 and the external server 209. However, a system that operates only by the terminal 103 without using the external server 209 may be adopted by causing the terminal 103 to execute the function of the external server 209. Specifically, the terminal 103 can be operated alone by adding the simple prediction unit 307, the voice conversion unit 308, and the user profile 309 to the terminal 103.

In other words, the terminal 103 in this case can have a structure including the motion detection unit 102 that detects the motion of the user, the prediction unit 307 that generates a plurality of word candidates predicted according to the non-vocalization data using the motion of the user detected by the motion detection unit 102, particularly the motion of the mouth of the user, as the non-vocalization data, and the voice conversion unit 308 that generates a voice to be output to the talk partner according to a word selected by the user from among the plurality of word candidates generated by the prediction unit 307.

Furthermore, the terminal 103 can have the user profile 309 that is a profile for improving the accuracy of a word candidate predicted for each user in the prediction unit 307. Typically, in the user profile 309, information unique to the user is stored in advance, and when the user executes a mouth motion in a silent manner, the prediction unit 307 can generate a word candidate according to the non-vocalization data and the information unique to the user stored in the user profile 309.

Furthermore, the operation of the terminal 103 can be executed using a program stored in the terminal 103. In other words, the operation of the terminal 103 can be executed by causing the main storage device and the auxiliary storage device that store the program constituting the terminal 103 to cooperate with the arithmetic device that performs the arithmetic operation for executing the program.

The terminal that does not use the external server 209 can be used particularly in a case where the user has vocal cord abnormality, in order to have a conversation without vocalization in a state of facing a talk partner.

Seventh Example Embodiment

In any one of the first to sixth example embodiments, or an example embodiment in which these are combined, the description has been given assuming that the user selects an intended word by looking at a word candidate displayed on the display unit 101, but the present invention is not limited thereto.

In other words, in order to cope with a user who has difficulty in viewing the displayed characters, the terminal 103 can read and present the word candidates instead of displaying the characters. Note that the display and reading of the word candidate may be performed at the same time, and the presentation of the word candidate by another method is not hindered.

Eighth Example Embodiment

In any one of the first to seventh example embodiments, or an example embodiment combining them, the terminal 103 may be a non-wearable terminal by human body implantation (implant).

Figure 13:
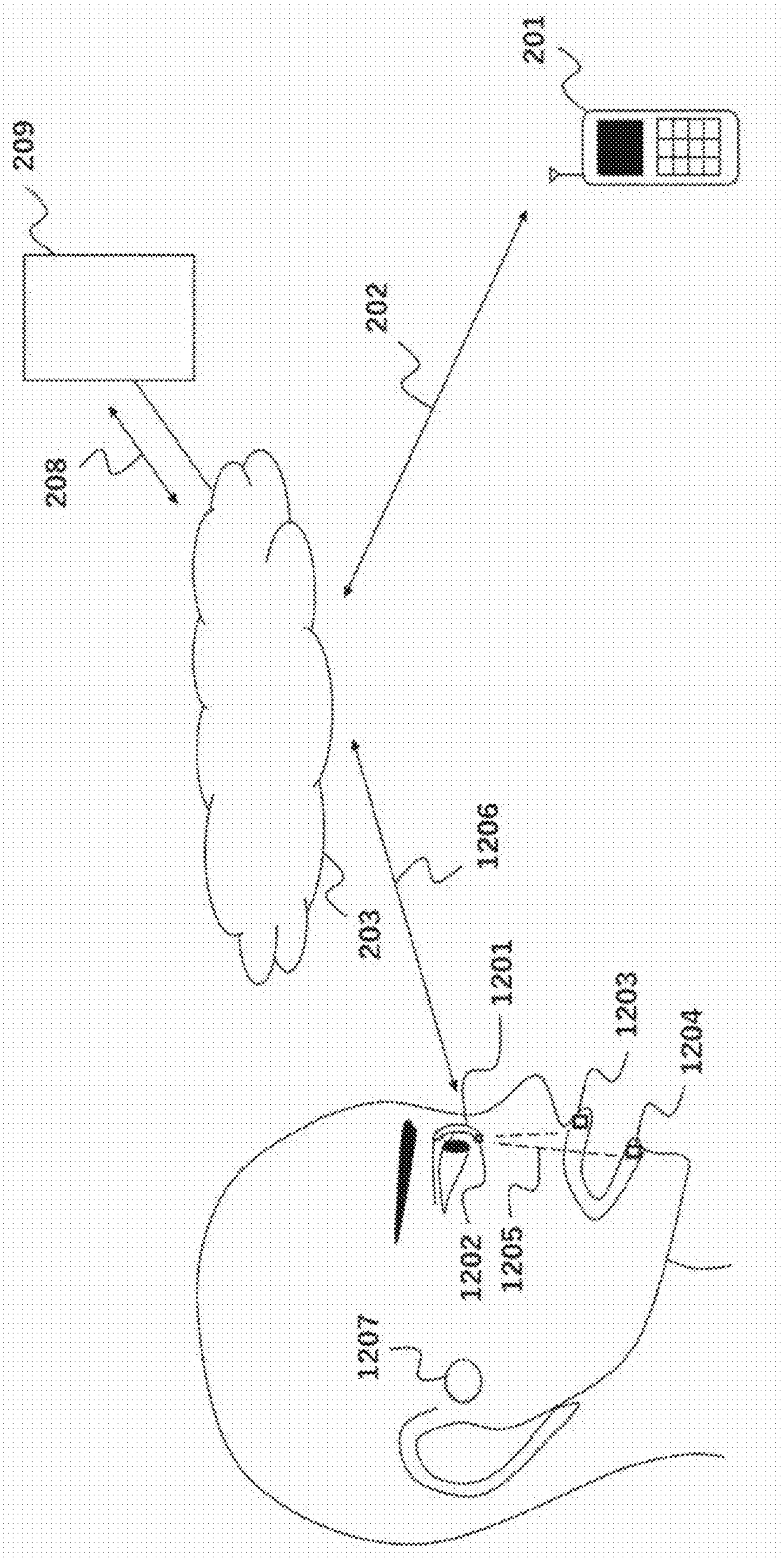
FIG. 13 is a diagram illustrating a state in which a terminal according to a seventh example embodiment is embedded in a human body and used.

That is, when further downsizing and weight reduction are achieved by technical innovation, each functional unit necessary for a silent call may be embedded in the human body. As an example, as illustrated in FIG. 13, it is possible to have a structure in which a contact lens type terminal 1201 having a display unit 101 is worn on the eyes of the user, a functional unit 1202 that reads the movement of the mouth is included in the terminal 1201, two fine sensors, a sensor 1203 for the upper lip and a sensor 1204 for the lower lip, that are not bothered even when embedded in the human body are embedded in the lips of the user, and the sense of distance of each sensor is read by the functional unit 1202.

Figure 14:
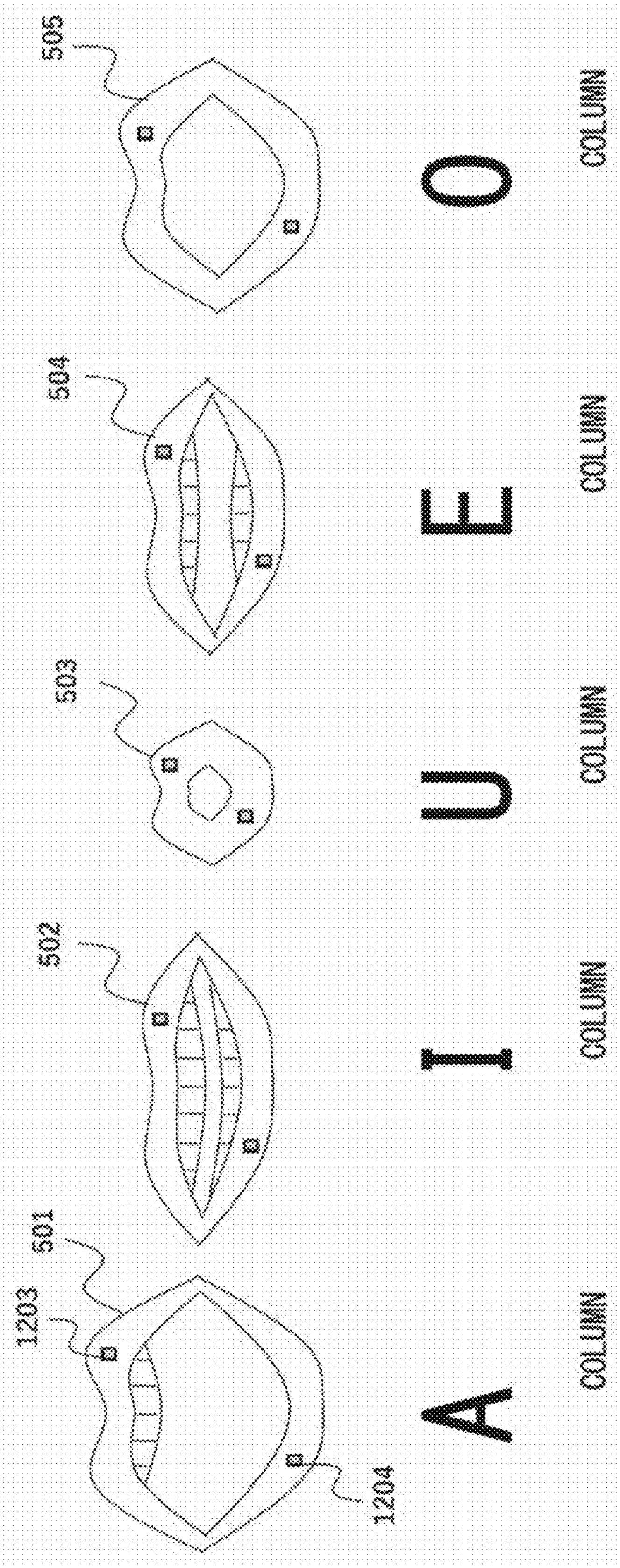
FIG. 14 is a diagram illustrating a state in which a sensor according to the seventh example embodiment is embedded in the human body and used.

The terminal 1201 has a communication function, and enables communication 1206 with the external server 209 and voice output to the voice output unit 1207 embedded around the ear. In addition, as illustrated in FIG. 14, the sensors 1203 and 1204 can be identified from the difference in the opening of the mouth at each column of the Japanese "A" row by being embedded on the diagonal lines of the upper lip and the lower lip.

Figure 15:
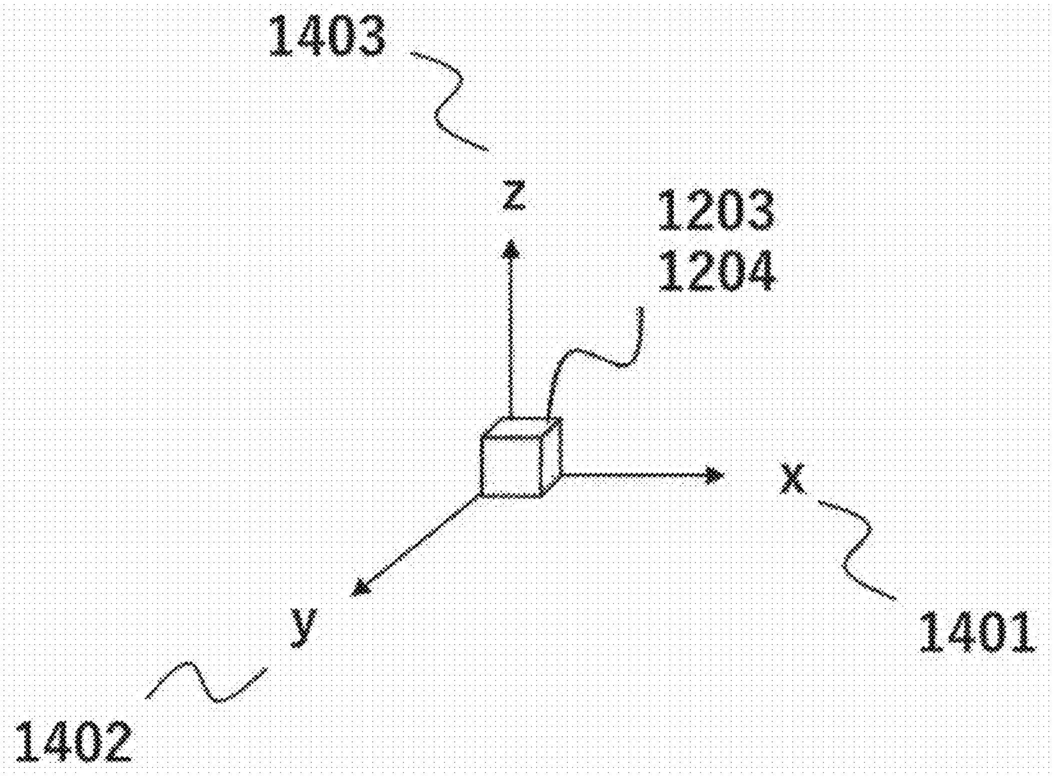
FIG. 15 is a diagram illustrating a detection direction by the sensor in a case where the sensor according to the seventh example embodiment is embedded in the human body and used.
Figure 16:
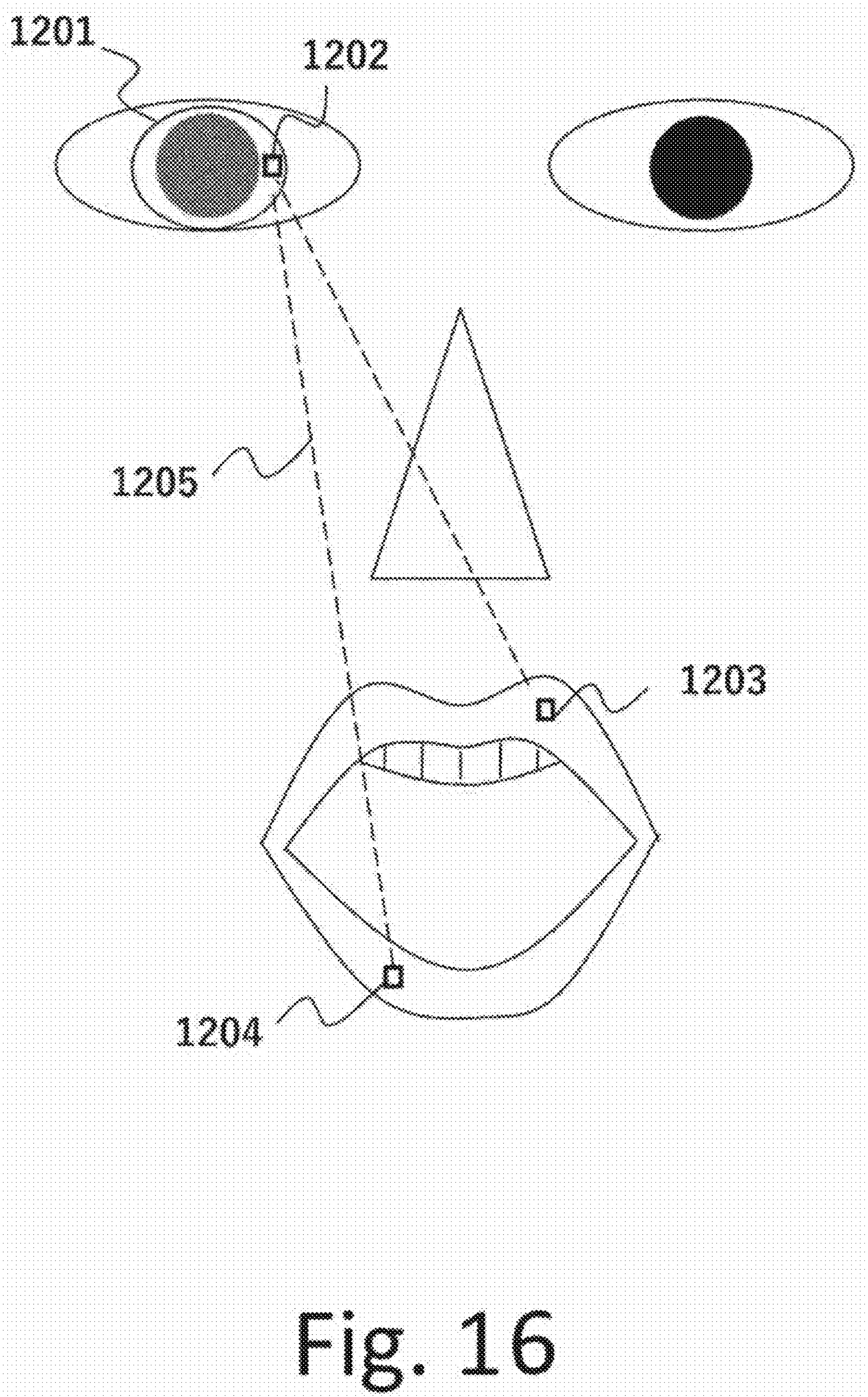
FIG. 16 is a diagram illustrating a state in which the sensor according to the seventh example embodiment is embedded in the human body and used.

Furthermore, as illustrated in FIG. 15, it is assumed that each sensor can detect three directions of a longitudinal direction x1401, a lateral direction y1402, and a height direction z1403, and as illustrated in FIG. 16, by reading 1205 each of the three directions from the functional unit 1202 of the terminal 1201 embedded in the eye, data that can be used as non-vocalization data can be acquired.

Although the invention of the present application has been described above with reference to the example embodiments, the invention of the present application is not limited to the above. Various modifications that can be understood by those skilled in the art can be made to the configuration and details of the present invention within the scope of the invention.

As an example, in the first example embodiment and the second example embodiment, the voice generated by the voice conversion unit 308 of the external server 209 is described as being transmitted from the external server 209 to the talk partner. However, the external server 209 that generates a word candidate, and a server or a terminal that generates a word intended by the user and transmits the word to the talk partner when the word intended by the user is selected from the generated word candidate may be different from the external server 209.

Alternatively, words may be generated by the voice conversion unit 308 of the external server 209, and the generated words may be transmitted from another component.

Furthermore, for example, the description has been given assuming that the motion detection unit 102 acquires the motion of the mouth, but the present invention is not limited thereto, and the motion detection unit may acquire the motion of another portion of the human body of the user. As an example, the motion detection unit 102 may acquire motions of other portions of the user's body such as eyelid movement together with the motion of the mouth of the user, and generate the non-vocalization data.

Furthermore, the above-described program may be stored in a non-transitory computer-readable medium or a tangible storage medium. By way of example, and not limitation, computer-readable media or tangible storage media include random-access memory (RAM), read-only memory (ROM), flash memory, solid-state drive (SSD) or other memory technology, CD-ROM, digital versatile disc (DVD), Blu-Ray® disc or other optical disk storage, magnetic cassettes, magnetic tape, magnetic disk storage, or other magnetic storage devices. The program may be transmitted on a transitory computer readable medium or a communication medium. By way of example, and not limitation, transitory computer-readable or communication media include electrical, optical, acoustic, or other forms of propagated signals.

REFERENCE SIGNS LIST

1 CALL SYSTEM
2 CALL SYSTEM
101 CANDIDATE PRESENTATION UNIT (DISPLAY UNIT)
102 MOTION DETECTION UNIT
103 TERMINAL (CALL APPARATUS)
104 ARM
201 COMMUNICATION TERMINAL
202 TRANSMITTED RADIO WAVE
203 COMMUNICATION LINE NETWORK
204 INCOMING RADIO WAVE
205 COMMUNICATION TERMINAL
206 NOTIFICATION
207 RADIO WAVE
208 RADIO WAVE
209 EXTERNAL SERVER
210 NON-VOCALIZATION DATA
301 COMMUNICATION FUNCTION UNIT
302 CONTROL UNIT
303 POSITION DETECTION UNIT
304 VOICE OUTPUT UNIT
305 COMMUNICATION FUNCTION UNIT
306 CONTROL UNIT
307 PREDICTION UNIT
308 VOICE CONVERSION UNIT
309 USER PROFILE
40 HABIT
402 CONTACT ADDRESS
403 HIGH-FREQUENCY WORD
404 SITUATION
405 TIME
406 USE POSITION INFORMATION
407 CONVERSATION CONTENT
501 Japanese "A" column
502 Japanese "I" column
503 Japanese "U" column
504 Japanese "E" column
505 Japanese "O" column
601 SUBDIVISION
602 EXTRACTION
603 AUTHENTICATION DATA
701 UPPER LEFT CORNER
702 LOWER LEFT CORNER
703 UPPER RIGHT CORNER
704 LOWER RIGHT CORNER
705 UPPER LEFT CORNER
706 LOWER LEFT CORNER
707 UPPER RIGHT CORNER
708 LOWER RIGHT CORNER
1001 EYEGLASSES
1101 COMMUNICATION
1201 TERMINAL
1202 FUNCTIONAL UNIT
1203, 1204 SENSOR
1205 READ
1206 COMMUNICATION
1207 VOICE OUTPUT UNIT
1401 LONGITUDINAL DIRECTION x
1402 LATERAL DIRECTION y
1403 HEIGHT DIRECTION z

What is claimed is:

1. A call system comprising:
a terminal held by a user; and
an external server configured to generate a candidate of a predicted word according to information transmitted from the terminal, wherein
the terminal comprises:
at least one memory storing instructions; and
at least one processor configured to execute the instructions to:
detect a motion of the user,
transmit non-vocalization data generated based on the motion of the user to the external server and receive a candidate for a word predicted by the external server, and
present the candidate of the word received from the external server to the user,
wherein detecting the motion comprises:
detecting a movement of a mouth of the user for each of patterns of mouth opening to utter a word;
creating reference pattern data for each of the patterns according to the movement of the mouth;
determining, for each instance of the mouth opening, a corresponding pattern of the patterns in the reference pattern data for the movement of the mouth; and
replacing a determination result with words as the non-vocalization data, and
the external server comprises:
at least one memory storing instructions; and
at least one processor configured to execute the instructions to:
predict the candidate of the word in accordance with the non-vocalization data received from the terminal, and
generate a voice to be output to a talk partner according to a word selected by the user from among a plurality of word candidates.

2. The call system according to claim 1, wherein the external server is configured to execute the instructions to transmit the voice to a terminal of the talk partner who is talking to the user.

3. The call system according to claim 1, wherein
the external server comprises a user profile configured to store unique information different for each user, and
predicting the candidate of the word comprises changing a candidate of a word to be predicted according to the unique information stored in the user profile.

4. The call system according to claim 3, wherein in the user profile, a habit of conversation of the user, information regarding the talk partner who is talking to the user, and a word frequently used by the user are stored as the unique information different for each user.

5. The call system according to claim 1, wherein
the terminal is a wearable terminal worn by the user and is configured to detect position information of the terminal, and
the terminal is configured to execute the instructions to change a candidate of a word to be predicted according to the position information, information regarding a time at which a call is made with the talk partner, and a call content with the talk partner.

6. The call system according to claim 1, wherein
the terminal further comprises a sensor configured to detect a tilt of the terminal,
the plurality of word candidates are displayed such that any one of the words is selected according to a tilt direction of the terminal acquired by the sensor, and
generating the voice comprises generating a voice according to the word selected based on the tilt of the terminal acquired by the sensor.

7. A call apparatus comprising:
at least one memory storing instructions; and
at least one processor configured to execute the instructions to:
detect a motion of a user;
store unique information different for each user in a user profile;
generate non-vocalization data based on the motion of the user and generate a plurality of word candidates predicted according to the non-vocalization data;
generate a voice to be output to a talk partner according to a word selected by the user from among the plurality of word candidates; and
transmit a signal generated from the voice, to an apparatus used by the talk partner, wherein
generating the plurality of the word candidates comprises changing a candidate of a word to be predicted according to the unique information stored in the user profile, and
detecting the motion comprises:
acquiring a movement of a mouth of the user for each of the patterns of mouth opening to utter a word;
creating reference pattern data for each of the patterns according to the movement of the mouth;
determining, for each instance of the mouth opening, a corresponding patter of the patterns in the reference pattern data for the movement of the mouth; and
replacing a determination result with words as the non-vocalization data.

8. A call method comprising:
storing unique information different for each user in a user profile;
detecting a motion of the user;
generating non-vocalization data based on the motion of the user;
generating a plurality of word candidates predicted according to the non-vocalization data and the unique information different for each user stored in the user profile; and
generating a voice to be output to a talk partner according to a word selected by the user from among the plurality of word candidates; and
transmitting a signal generated from the voice, to an apparatus used by the talk partner, wherein
generating the plurality of the word candidates comprises changing a candidate of a word to be predicted according to the unique information stored in the user profile,
detecting the motion comprises:
acquiring a movement of a mouth of the user for each of the patterns of mouth opening to utter a word;
creating reference pattern data for each of the patterns according to the movement of the mouth;
determining, for each instance of the mouth opening, a corresponding pattern of the patterns in the reference pattern data for the movement of the mouth corresponds to; and
replacing a determination result with words as the non-vocalization data.

9. The call system according to claim 1, wherein
detecting the motion comprises detecting physical positional relationships between a plurality of sensors embedded in human body as the movement of the mouth.

10. The call apparatus according to claim 7, wherein
detecting the motion comprises detecting physical positional relationships between a plurality of sensors embedded in human body as the movement of the mouth.

11. The call method according to claim 8, wherein
detecting the motion comprises detecting physical positional relationships between a plurality of sensors embedded in human body as the movement of the mouth.

* * * * *